(12) United States Patent
Hess et al.

(10) Patent No.: US 11,939,175 B2
(45) Date of Patent: Mar. 26, 2024

(54) AUTOMATED GLASS ARTICLE BUNDLING AND PALLETIZING APPARATUSES AND METHODS

(71) Applicant: CORNING INCORPORATED, Corning, NY (US)

(72) Inventors: Marty Eric Hess, Corning, NY (US); Kevin Robert Kaelin, Pine City, NY (US); Patrick Aaron Parks, Elmira, NY (US); Evan Marshall Rathbun, Gillett, PA (US); Gregory James Tenbus, Gillett, PA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/987,308

(22) Filed: Nov. 15, 2022

(65) Prior Publication Data

US 2023/0150780 A1    May 18, 2023

Related U.S. Application Data

(60) Provisional application No. 63/279,364, filed on Nov. 15, 2021.

(51) Int. Cl.
*B65G 57/24* (2006.01)
*B65B 13/02* (2006.01)
(Continued)

(52) U.S. Cl.
CPC .............. *B65G 57/24* (2013.01); *B65B 13/02* (2013.01); *B65B 13/20* (2013.01); *B65B 23/22* (2013.01);
(Continued)

(58) Field of Classification Search
CPC .... B65G 57/24; B65G 57/005; B65G 57/186; B65B 13/02; B65B 13/20; B65B 23/22
(Continued)

(56) References Cited

U.S. PATENT DOCUMENTS 1,781,360 A   11/1930   Armor
1,923,753 A * 8/1933   Scofield .............. B65G 47/763
                                                  404/101
(Continued)

FOREIGN PATENT DOCUMENTS

DE          10056422 A1   5/2002
DE       102006024072 A1  11/2007
(Continued)

OTHER PUBLICATIONS

International Search Report and Written Opinion of the International Searching Authority; PCT/US2022/048666; dated Apr. 13, 2023, 10 pages; European Patent Office.
(Continued)

*Primary Examiner* — Lynn E Schwenning
(74) *Attorney, Agent, or Firm* — F. Brock Riggs

(57) ABSTRACT

An apparatus that forms bundles of glass articles includes a glass article infeed station including an infeed conveyor that continuously transports individual glass articles to a layer separating conveyor. The layer separating conveyor includes a conveyor belt that forms a layer of side-by-side glass articles. A robotic lift assembly is configured to place the layer of side-by-side glass articles together on a layer separation insert. The layer separation insert has side-by-side slots that each receive a single glass article of the layer of side-by-side glass articles.

20 Claims, 18 Drawing Sheets

(51) Int. Cl.
*B65B 13/20* (2006.01)
*B65B 23/22* (2006.01)
*B65G 57/00* (2006.01)
*B65G 57/18* (2006.01)
*B65G 61/00* (2006.01)

(52) U.S. Cl.
CPC ......... *B65G 57/005* (2013.01); *B65G 57/186* (2013.01); *B65G 61/00* (2013.01); *B65G 2203/0233* (2013.01); *B65G 2203/0241* (2013.01)

(58) Field of Classification Search
USPC .............................................. 53/531; 198/531
See application file for complete search history.

(56) References Cited

U.S. PATENT DOCUMENTS

| | | | |
|---|---|---|---|
| 2,564,729 A | 8/1951 | Shepard | |
| 2,568,769 A | 9/1951 | Shepard | |
| 2,838,173 A | 6/1958 | Emery | |
| 3,462,582 A | 8/1969 | Cines | |
| 3,572,005 A | 3/1971 | Allen et al. | |
| 3,654,745 A | 4/1972 | Smith et al. | |
| 3,662,512 A | 5/1972 | Zelnick | |
| 3,670,866 A | 6/1972 | Olivotto | |
| 3,708,084 A | 1/1973 | Reifers et al. | |
| 3,926,299 A | 12/1975 | Bradley et al. | |
| 4,236,855 A | 12/1980 | Wagner et al. | |
| 4,250,687 A | 2/1981 | Lueneberg et al. | |
| 4,362,454 A | 12/1982 | Kripzak | |
| 4,439,091 A | 3/1984 | Frias | |
| 4,541,762 A | 9/1985 | Tischler et al. | |
| 4,765,487 A | 8/1988 | Bliss | |
| 4,832,183 A | 5/1989 | Lapeyre | |
| 5,000,905 A | 3/1991 | Cox et al. | |
| 5,180,277 A | 1/1993 | Pearce et al. | |
| 5,207,727 A | 5/1993 | Pearce et al. | |
| 5,311,724 A * | 5/1994 | Vernon | B65B 57/14 53/529 |
| 5,769,601 A | 6/1998 | Agne et al. | |
| 6,558,108 B1 | 5/2003 | Van Oord | |
| 6,606,841 B1 | 8/2003 | Germunson | |
| 6,840,369 B2 * | 1/2005 | Derenthal | B65G 47/647 198/418.6 |
| 7,311,199 B2 | 12/2007 | Vantilt | |
| 7,416,379 B2 | 8/2008 | Roesch | |
| 7,766,591 B2 | 8/2010 | Douglas | |
| 7,819,621 B2 | 10/2010 | Veit et al. | |
| 8,538,885 B2 | 9/2013 | Faith et al. | |
| 8,551,898 B2 | 10/2013 | Danielson et al. | |
| 8,770,911 B2 * | 7/2014 | Webb | B65G 17/26 198/725 |
| 9,623,989 B2 | 4/2017 | Loevenich | |
| 9,926,147 B2 | 3/2018 | Kuhn et al. | |
| 11,299,306 B2 * | 4/2022 | Kittanakere-Naagaraj | B65G 57/14 |
| 2011/0005171 A1 * | 1/2011 | Woerz | B65G 47/268 53/448 |
| 2012/0234714 A1 | 9/2012 | Arai | |
| 2014/0245701 A1 | 9/2014 | Loevenich | |
| 2015/0158611 A1 * | 6/2015 | Kalany | B65G 47/26 53/531 |
| 2016/0221736 A1 | 8/2016 | Hayashi et al. | |
| 2017/0073173 A1 | 3/2017 | Kuhn et al. | |
| 2017/0369194 A1 * | 12/2017 | Kittanakere Naagaraj | A61J 3/00 |
| 2020/0189839 A1 | 6/2020 | Sparschuh | |

FOREIGN PATENT DOCUMENTS

| | | |
|---|---|---|
| JP | 49-099855 A | 9/1974 |
| JP | 49-112666 A | 10/1974 |
| JP | 51-027672 A | 3/1976 |
| JP | 54-016296 A | 2/1979 |
| JP | 61-273314 A | 12/1986 |
| JP | 63-248626 A | 10/1988 |
| JP | 09-295686 A | 11/1997 |
| JP | 10-006257 A | 1/1998 |
| JP | 10-194456 A | 7/1998 |
| JP | 10-236422 A | 9/1998 |
| JP | 11-314608 A | 11/1999 |
| JP | 2009-292642 A | 12/2009 |
| JP | 5127672 B2 | 1/2013 |
| JP | 2015-054723 A | 3/2015 |
| JP | 2015-231868 A | 12/2015 |
| WO | 2014/209833 A1 | 12/2014 |
| WO | 2015/128452 A1 | 9/2015 |

OTHER PUBLICATIONS

Japanese Patent Application No. 2022-011885, Office Action, dated Sep. 28, 2022, 7 pages (3 pages of English Translation and 4 pages of Original Copy); Japanese Patent Office.

* cited by examiner

AUTOMATED GLASS ARTICLE BUNDLING AND PALLETIZING APPARATUSES AND METHODS

This application claims the benefit of priority under 35 U.S.C. § 119 of U.S. Provisional Application Ser. No. 63/279,364, filed on Nov. 15, 2021, the content of which is relied upon and incorporated herein by reference in its entirety.

BACKGROUND

Field

The present specification generally relates to methods and apparatuses for bundling and palletizing glass articles and, more particularly, to methods and apparatuses for bundling and palletizing glass tubes for pharmaceutical packages that eliminate glass-to-glass interactions between the glass tubes and human contact during the packaging process.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1B' which have a proven history of chemical durability.

However, use of glass for such applications is limited by the mechanical performance of the glass. In the pharmaceutical industry, glass breakage is a concern, not just for product quality, but also for the end user. Even non-catastrophic breakage (i.e., when the glass cracks but does not break) may cause the contents to lose their sterility which, in turn, may result in costly product recalls.

Specifically, handling or bundling of glass articles throughout the pharmaceutical package producing process can result in significant glass-to-glass contact, which can create scratches and defects in the glass. This mechanical damage can significantly decrease the strength of the glass pharmaceutical package resulting in an increased likelihood that cracks will develop in the glass, potentially compromising the sterility of the pharmaceutical contained in the package or causing the complete failure of the package. Reducing or even eliminating glass-to-glass contact can result in significant improvements in physical properties of the pharmaceutical packages.

Accordingly, a need exists for methods and apparatuses for packaging glass articles, such as tubes for pharmaceutical packages that reduce or even eliminate glass-to-glass interactions during the packaging process.

SUMMARY

According to one embodiment, an apparatus that forms bundles of glass articles includes a glass article infeed station including an infeed conveyor that continuously transports individual glass articles to a layer separating conveyor. The layer separating conveyor includes a conveyor belt that forms a layer of side-by-side glass articles. A robotic lift assembly is configured to place the layer of side-by-side glass articles together on a layer separation insert. The layer separation insert has side-by-side slots that each receive a single glass article of the layer of side-by-side glass articles.

According to another embodiment, a method of handling glass articles to form bundles of the glass articles is provided. The method includes continuously transporting individual glass articles in the form of glass tubes or rods having a first outer diameter to a layer separating conveyor and forming a first layer of side-by-side glass articles on the layer separating conveyor. Using a robotic lift assembly, placing the first layer of side-by-side glass articles together on a layer separation insert, the layer separation insert having side-by-side slots that each receive a single glass article of the first layer of side-by-side glass articles.

According to another embodiment, an apparatus that forms bundles of glass articles includes a layer separating conveyor comprising a conveyor belt that forms a layer of side-by-side glass articles. A robotic lift assembly is configured to place the layer of side-by-side glass articles in a first spaced-apart configuration together on a re-pitch station that comprises adjustable article retaining regions that adjust position automatically to decrease a distance between adjacent side-by-side glass articles to a second spaced-apart configuration.

Additional features and advantages of the glass articles and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
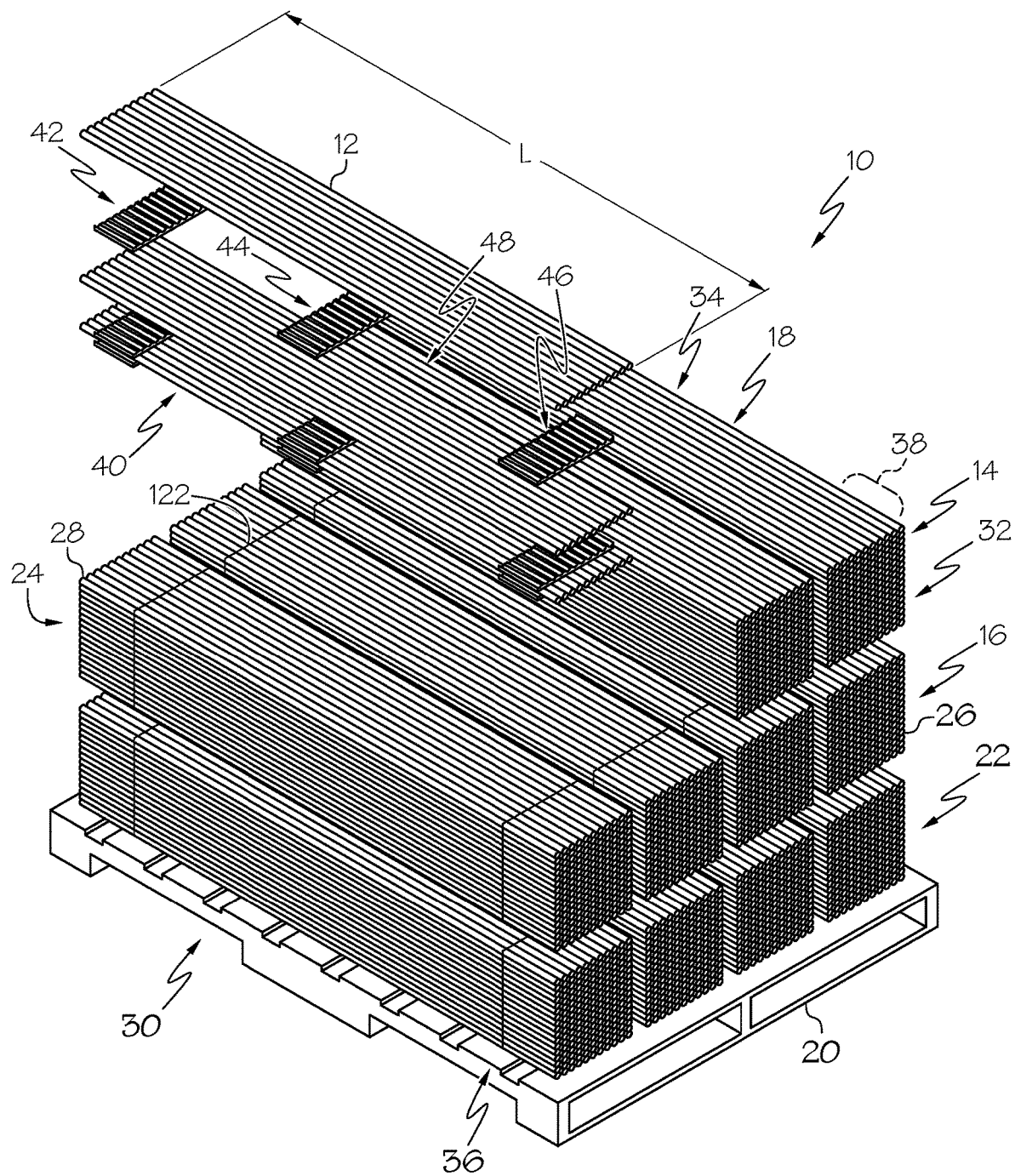
FIG. 1 is a perspective, partially exploded view of a palletized package formed of stacked bundles of glass articles, according to one or more embodiments shown and described herein.

Reference will now be made in detail to various embodiments of methods and apparatuses for packaging glass articles, such as tubes for pharmaceutical packages that reduce or even eliminate glass-to-glass interactions during the packaging process, examples of which are depicted in the figures. The glass articles may be further processed and, for example, used as glass containers suitable for use in various packaging applications including, without limitation, as pharmaceutical packages. These pharmaceutical packages may or may not contain a pharmaceutical composition. Various embodiments of the methods and apparatuses for packaging glass articles that reduce or even eliminate glass-to-glass interactions during the packaging process will be described in further detail herein with specific reference to the appended drawings.

Generally, the methods and apparatuses may utilize glass receiving inserts that are suitable for touching and supporting the glass articles. The layer separation inserts may include individual slots that are each sized and arranged to receive individual glass articles to form a layer of the glass articles. The layers of the glass articles can be stacked, one on top of the other with their layer separation inserts, which can then provide separation barriers between the layers of the glass articles and also between adjacent glass articles of the same layer.

Embodiments described herein include an apparatus that forms bundles of the glass articles. The bundles, in turn, can be stacked to form a palletized package of the glass articles along with their layer separation inserts. The apparatus includes a glass article infeed station that includes an infeed conveyor that continuously transports individual glass articles to a layer separating conveyor. The layer separating conveyor includes a conveyor belt that includes sectioned article retaining regions that are each sized and configured to receive a single glass article from the infeed station and retain the single glass article spaced from adjacent glass articles that forms a layer of side-by-side glass articles. In some embodiments, a re-pitch station includes adjustable article retaining regions that each receive a single one of the glass articles of the layer of side-by-side glass articles. The adjustable article retaining regions adjust position automatically to decrease a distance between adjacent side-by-side glass articles from a first spaced-apart configuration of greater pitch to a second spaced-apart configuration of lesser pitch. A robotic lift assembly may be provided that is configured to place the layer of side-by-side glass articles together on a plurality of layer separation inserts in the second configuration. The layer separation inserts have side-by-side slots that each receive a single one of the glass articles of the layer of side-by-side glass articles. The methods and apparatuses provide for automated packaging of the glass articles using the glass receiving inserts to reduce or even eliminate glass-to-glass contact and human handling of the glass articles during the packaging process.

Referring to FIG. 1, an example of a palletized package 10 of multiple glass articles 12 in the form of individual tubes is illustrated. The palletized package 10 is formed of multiple bundles 14 of the glass articles 12 stacked in both rows 16 and columns 18 on a pallet 20. The palletized package 10 includes opposite ends 22 and 24 at which ends 26 and 28 of the glass articles 12 are arranged, opposite sides 30 and 32 that extend between the ends 26 and 28, a top 34 and a bottom 36 that rests on the pallet 20. In some embodiments, the palletized package 10 and/or the multiple bundles 14 may be wrapped in an outer wrap (represented by the dotted line 38), such as a plastic film (e.g., a shrink wrap, stretch wrap, etc.). Wrapping the palletized package 10 with the outer wrap 38 can increase rigidity and structural integrity to the overall palletized package 10 by securing the bundles together and inhibiting particles from entering the glass articles.

As shown by the exploded portion of FIG. 1, the bundles 14 are each formed by glass article layers 40 stacked one over another. Each glass article layer 40 may be formed of any suitable number of the glass articles 12, such as four, six, eight, 10, 12, 14, 18, 20 glass articles and arranged side-by-side. The number of the glass articles 12 in each layer may depend on, for example, the properties of the glass articles, such as size, weight, etc. As an example, the glass articles 12 may have an outer diameter of between about 8.5 mm and 30 mm. The glass article layers 40 may be relatively long in length L (e.g., about one meter or more, such as about 1.5 meters or more) and relatively short in height H (e.g., a diameter of the glass article tubes).

Layer separation inserts 42, 44 and 46 are provided between each of the glass article layers. Layer separation inserts 42 and 46 may be end layer separation inserts and layer separation insert 44 may be a middle separation insert. While one middle layer separation insert 44 is illustrated, there may be multiple middle layer separation inserts. The end layer separation inserts 42 and 46 may be located near the opposite ends 26 and 28 with the middle layer separation insert 44 located therebetween. As can be seen, the layer separation inserts 42, 44 and 46 may be shorter than the length L of the glass article layers 40 and may be separated from each other along the length L providing gaps 48 between adjacent glass article layers 40. Such an arrangement can reduce material used to form the layer separation inserts 42, 44 and 46 compared to longer layer separation inserts, while still supporting the glass article layers 40 from each other.

Figure 2A:
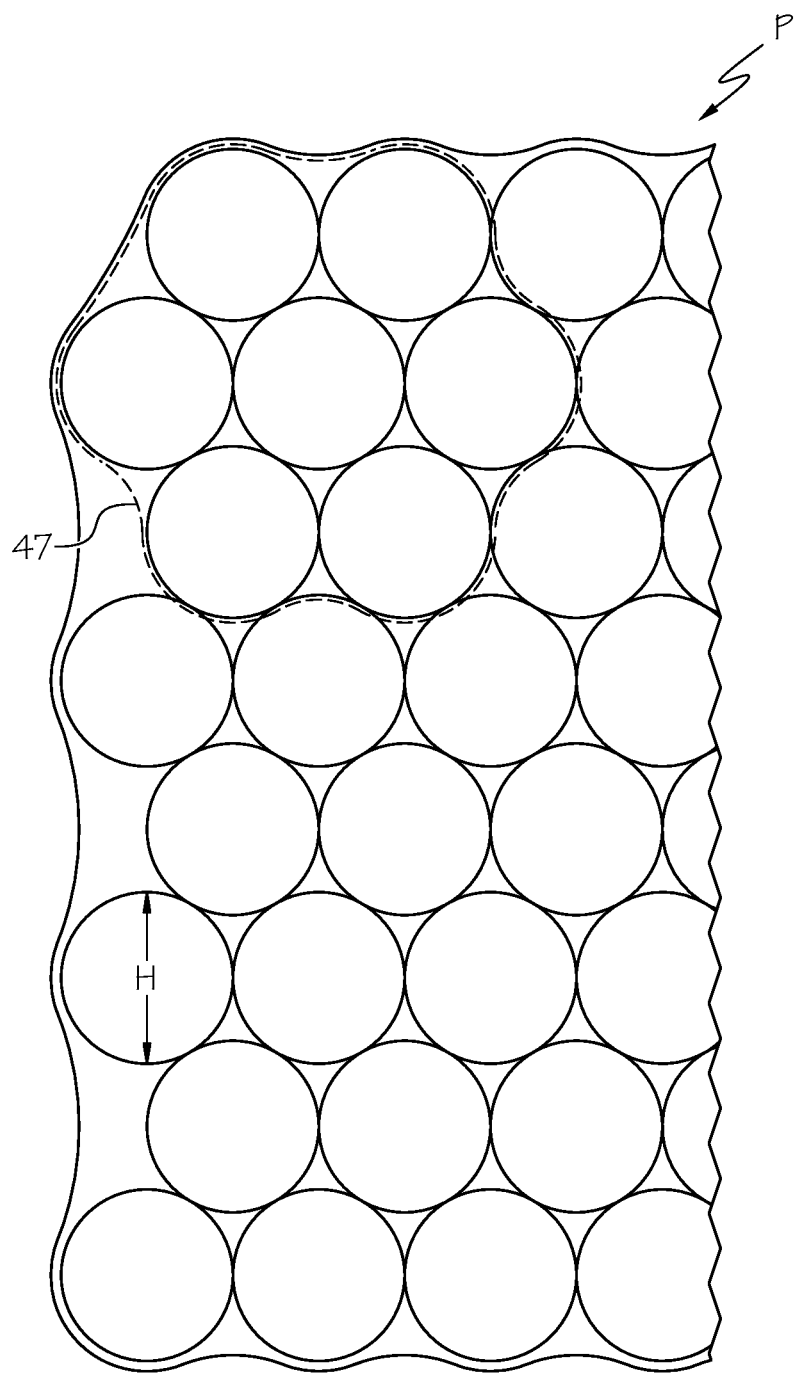
FIG. 2A is a detail end view of a bundle for use in forming a palletized package without separation between adjacent glass articles.

FIG. 2A illustrates a detail end view of glass article layers stacked one over another in a known configuration where the glass articles contact. The glass article layers are stacked in an offset configuration (e.g., offset a half diameter in the side-to-side or widthwise direction) that form hexagonal patterns (highlighted by dotted lines 47) of the glass articles 12. Such an arrangement results in significant glass-to-glass contact which can cause scratches and other mechanical damage to the glass articles.

Figure 2B:
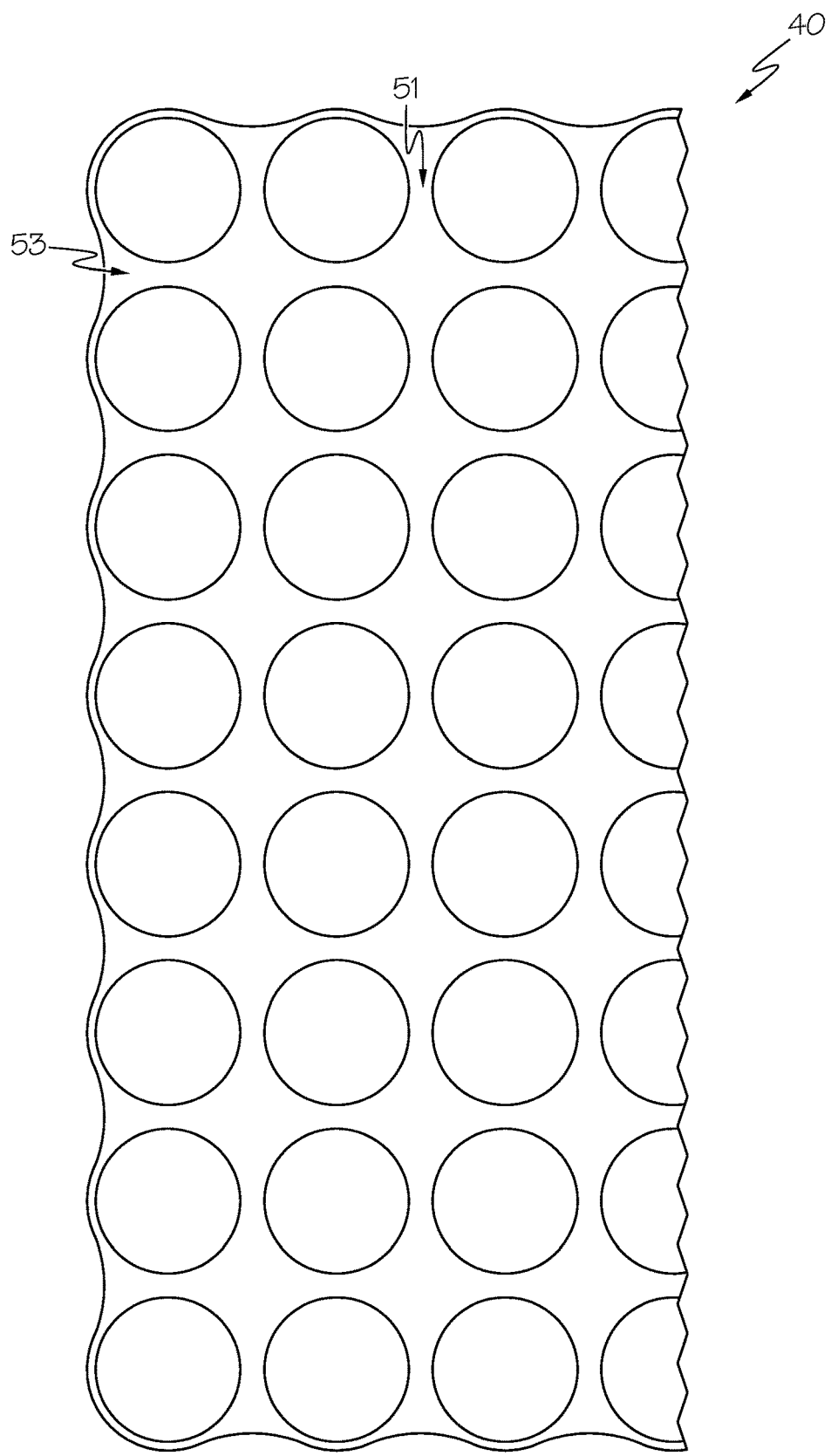
FIG. 2B is a detail view of the palletized package of FIG. 1 formed of multiple glass article layers illustrating separation between adjacent glass articles, according to one or more embodiments shown and described herein.

Referring to FIG. 2B, the layer separation inserts 42, 44 and 46 (FIG. 1) separate the individual glass articles 12 from one another in both the height wise and widthwise directions. In other words, the glass articles 12 are separated from one another between both rows and within each glass article layer 40 by the layer separation inserts 42, 44 and 46. As can be seen, gaps 51 are provided between adjacent glass articles 12 of the glass layers 40 and gaps 53 are provided between adjacent glass articles 12 of adjacent glass layers 40.

Figure 3:
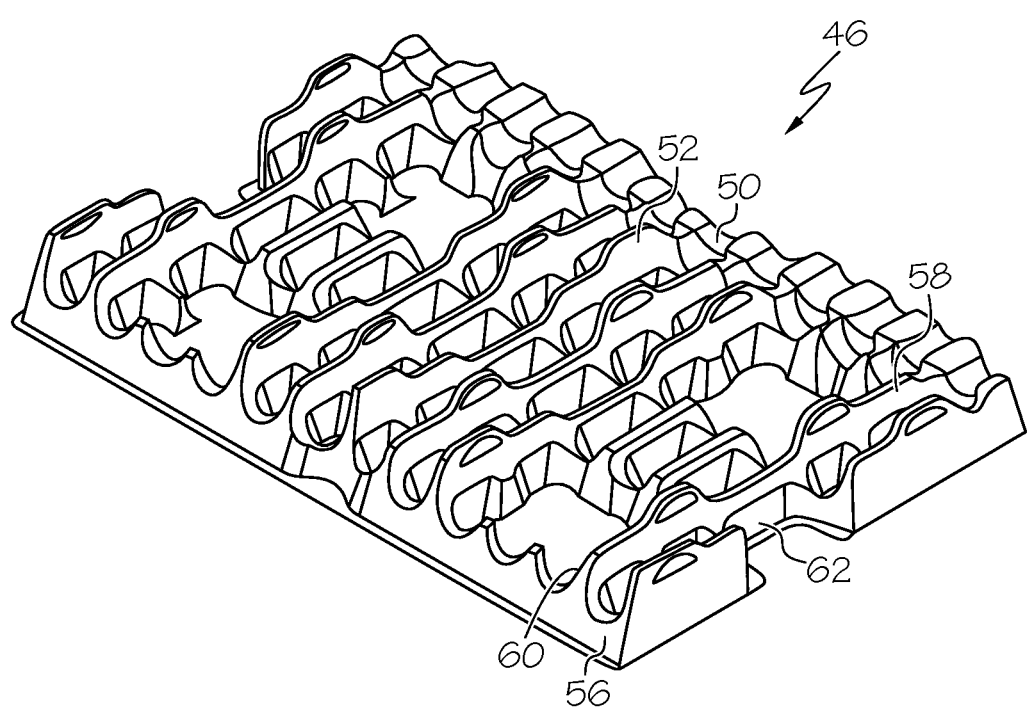
FIG. 3 is a perspective view of a layer separation insert for use in separating the glass articles of a bundle, according to one or more embodiments shown and described herein.

Referring to FIG. 3, the end layer separation insert 46 is illustrated. While the end layer separation insert 46 is shown, the layer separation insert 42 and 44 may include the same or similar features suitable for holding and separating the glass articles 12. In some embodiments, the end layer separation inserts may have closed sides to cover ends of the glass articles 12. The end layer separation insert 46 includes a row of article receiving slots 50 that are each sized to receive the ends 28 of the glass articles 12 therein. The slots 50 may have a shape (e.g., round) that is complementary with an outer shape of the glass articles 12 to allow the glass articles 12 to nest within the article receiving slots 50. Each article receiving slot 50 includes a side wall 52 that extends along a length of the article receiving slot 50. The side walls 52 extend outwardly from a base 56 that extends along each of the article receiving slots 50. Height extension tabs 58 and 60 may extend outwardly from top edges 62 of the side walls 52. The height extension tabs 58 and 60 may be provided to extend outwardly beyond the glass articles 12 when provided in the article receiving slots 50 and to contact a base 56 of an adjacent end layer separation insert 46 thereby supporting at least some downward load. Contact between the height extension tabs 58, 60 and the base 56 of an adjacent end layer separation insert 46 can provide the spacing between the adjacent glass layers 40. The height extension tabs 58 may be offset from the height extension tabs 60 in the end-to-end or lengthwise direction, which can provide increased stability for the glass article layers 40 when stacked. Ends 62 of the article receiving slots 50 are open and unobstructed to allow the glass articles 12 to extend out of the article receiving slots 50 in a horizontal fashion.

The layer separation inserts 42, 44 and 46 may have the article receiving slots 50 that are sized and arranged to carry tubular glass articles 12 of different diameters. For example, the article receiving slots 50, 64 may be sized to hold tubular glass articles of between about 8.5 mm and 30 mm. Further, the height extension tabs 58, 60, 70, 72 may have heights that are sufficient to contact the bases 56 of an adjacent layer separation insert 42, 44, 46 for any of the tubular glass articles 12 of different diameters. The lengths of the tubes may be selected to also be substantially the same regardless of diameter. In this way, the overall width, length and height of the layers 40, bundles 14 and palletized packages 10 can be substantially the same regardless of the diameter of the tubular glass articles 12, which can reduce the complexity of the packaging, shipping and handling processes. If the heights of the height extension tabs 58, 60 (and/or side walls 52) are below a portion of the tubular glass articles 12, the heights of the layers 40, bundles 14 and palletized packages 10 may vary depending on the diameter of the tubular glass articles 12, but the widths and lengths may be the same.

The layer separation inserts 42, 44 and 46 may be formed of any suitable material, such as amorphous polyethylene terephthalate (APET), silicone, etc. that can contact and protect the glass articles 12, while providing the desired separation between the glass article layers 40 (FIG. 2B). In some embodiments, the layer separation inserts 42, 44 and 46 may be formed or a re-usable and/or recyclable material. Any suitable process may be used to form the layer separation inserts 42, 44 and 46, such as molding.

The glass articles 12 may be formed from a variety of different glass compositions. The specific composition of the glass article may be selected according to the specific application such that the glass has a desired set of physical properties.

The glass articles 12 may be formed from a glass composition which has a coefficient of thermal expansion in the range from about $25 \times 10^{-7}/°$ C. to $80 \times 10^{-7}/°$ C. For example, in some embodiments described herein, the glass articles 12 are formed from alkali aluminosilicate glass compositions which are amenable to strengthening by ion exchange. Such compositions generally include a combination of $SiO_2$, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments, the glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition. In another embodiment, the glass surface may comprise a metal oxide coating comprising $SnO_2$, $ZrO_2$, $ZnO$, $TiO_2$, $As_2O_3$, or the like In one particularly exemplary embodiment, the glass articles 12 may be formed from an ion exchangeable glass composition described in pending U.S. patent application Ser. No. 13/660,894 filed Oct. 25, 2012 and entitled "Glass Compositions with Improved Chemical and Mechanical Durability" assigned to Corning, Incorporated.

However, it should be understood that the articles 12 described herein may be formed from other glass compositions including, without limitation, ion-exchangeable glass compositions and non-ion exchangeable glass compositions.

For example, in some embodiments the glass container may be formed from Type 1B glass compositions such as, for example, Schott Type 1B or other borosilicate or aluminosilicate glass compositions suitable for use in pharmaceutical packaging.

In some embodiments described herein, the glass articles 12 may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, glasses meet the Type I criteria are routinely used for parenteral packaging. Examples of borosilicate glass include, but not limited to Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20\text{-}85 \times 10^{-7}$° $C.^{-1}$. Another glass composition that meets Type criteria for hydrolytic resistance and chemical durability is Corning Valor® glass.

Figure 4:
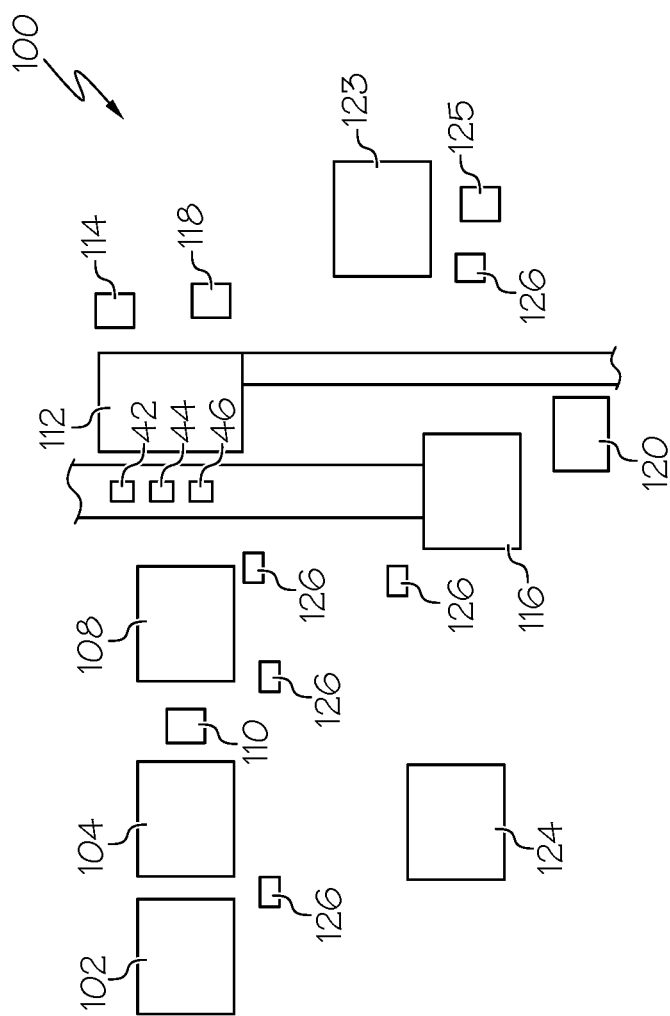
FIG. 4 illustrates an automated glass article bundling and palletizing method and apparatus for forming the multiple bundles that are stacked to form the palletized package of FIG. 1, according to one or more embodiments shown and described herein.
Figure 5:
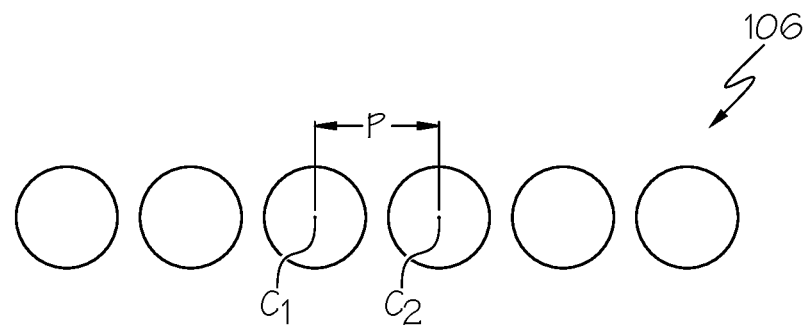
FIG. 5 depicts a layer of glass articles having a predetermined pitch, according to one or more embodiments shown and described herein.

Referring to FIG. 4, an automated glass article bundling and palletizing method and apparatus 100 is illustrated for forming the multiple bundles 14 that are stacked to form the palletized package 10 of FIG. 1. The bundling and palletizing apparatus 100 includes a glass article infeed station 102 where individual glass articles 12 are provided to a layer separating station 104 (e.g., using a conveyor). The layer separating station 104 can utilize a conveyor that separates a preselected number of the individual glass articles 12 from other incoming glass articles 12 to form layers of the glass articles 12 having a first spaced-apart configuration of a pre-selected pitch. As used herein, the term "pitch" refers to the distance between corresponding points on adjacent glass articles 12 of a glass article layer. Referring briefly to FIG. 5, a glass article layer 106 includes glass articles 12 having a pitch P between lengthwise centerlines $C_1$ and $C_2$, as an example. The pitch of a glass article layer is substantially constant (e.g., ±10 millimeters) for that glass article layer. For example, a pitch P of the first spaced-apart configuration may be no more than about 100 mm, such as no more than about 75 mm, such as no more than about 50 mm, such as no more than about 40 mm, such as no more than about 30 mm, such as no more than about 20 mm, such as no more than about 15 mm.

Referring again to FIG. 4, after the glass article layer is formed and separated with its predetermined number of glass articles 12, it is provided to a re-pitch station 108. For example, a robotic lift assembly 110 may carry the entire glass article layer in the first spaced-apart configuration from the layer separating station 104 to the re-pitch station 108. The re-pitch station 108 receives the entire glass article layer in the first-spaced-apart configuration and reduces the pitch to a second spaced-apart configuration of reduced pitch. For example, a pitch of the second spaced-apart configuration may be no more than about 50 mm, such as no more than about 30 mm, such as no more than about 15 mm, such as no more than about 10 mm. The pitch of the second spaced-apart configuration may be selected to correspond to a pitch of the article receiving slots 50 (FIG. 3).

Once the pitch of the glass article layer is adjusted (e.g., reduced) at the re-pitch station 108, it is provided to a bundle build station 112. For example, another robotic lift assembly 114 may carry the entire glass article layer in the second spaced-apart configuration from the re-pitch station 108 to the bundle build station 112. Waiting for the glass article layer are the layer separation inserts 42, 44 and 46 (FIG. 3). The robotic lift assembly 114 is configured to place the glass articles of the entire glass article layer into their respective individual article receiving slots 50 simultaneously. Then, additional layer separation inserts 42, 44 and 46 are fed from an insert feed station 116 (e.g., using a conveyor) and placed on the glass article layer to receive another re-pitched glass article layer. The additional layer separation inserts 42, 44 and 46 may be placed on the glass article layer using another robotic lift assembly 118.

The process continues until a bundle is built at the bundle build station 112. Then, the bundle is transported to a bundle packaging system 120 (e.g., using a conveyor). A band 122 (FIG. 1) can be placed around an end of the bundle to constrain movement of the glass articles relative to each other. Multiple bands may be placed around the bundle at different locations, such as at both ends and any location in-between. Use of bands can also reduce contamination and eliminate a need for cardboard boxes, reducing needed storage space and processing. The banded bundles are then stacked at a pallet build station 123 using a robotic lift assembly 125 to form a pallet (FIG. 1).

Referring still to FIG. 4, a control system 124 is provided that can be used to control automated aspects of the bundling and palletizing apparatus 100. The control system 124 may be formed of at least one or multiple computing devices for controlling the automated aspects including the conveyors, re-pitch station and robotic lift assemblies. The control system 124 may also monitor progress of the glass articles and layer separation inserts at one, some or all of the stations 102, 108, 112, 116, 120 and 123. For example, sensors 126, such as cameras, proximity, etc., may be located so that the control system 124 can identify (e.g., using a vision system and image data) if a glass article and/or layer separation insert is missing at one some or any of the stations 102, 108, 112, 116, 120 and 123. Further, the control system 124 can identify a glass type, such as aluminosilicate and borosilicate.

Occasionally, glass articles may "jump" from one article retaining region to another, crossing over another glass article in its article retaining region. The control system 124 can automatically detect, track and reject both of the glass articles having glass-to-glass contact to a reject station 128. Then, those article retaining regions having rejected glass articles can be re-filled and the packaging process continued. In some embodiments, the control system 124 can track individual glass articles, layers, bundles and pallets through the bundling and palletizing method and apparatus 100. Glass articles can be inspected by the control system 124 and individual or multiple glass articles can be removed based on a command from an operator and/or automatically should a defect be detected.

Figure 6:
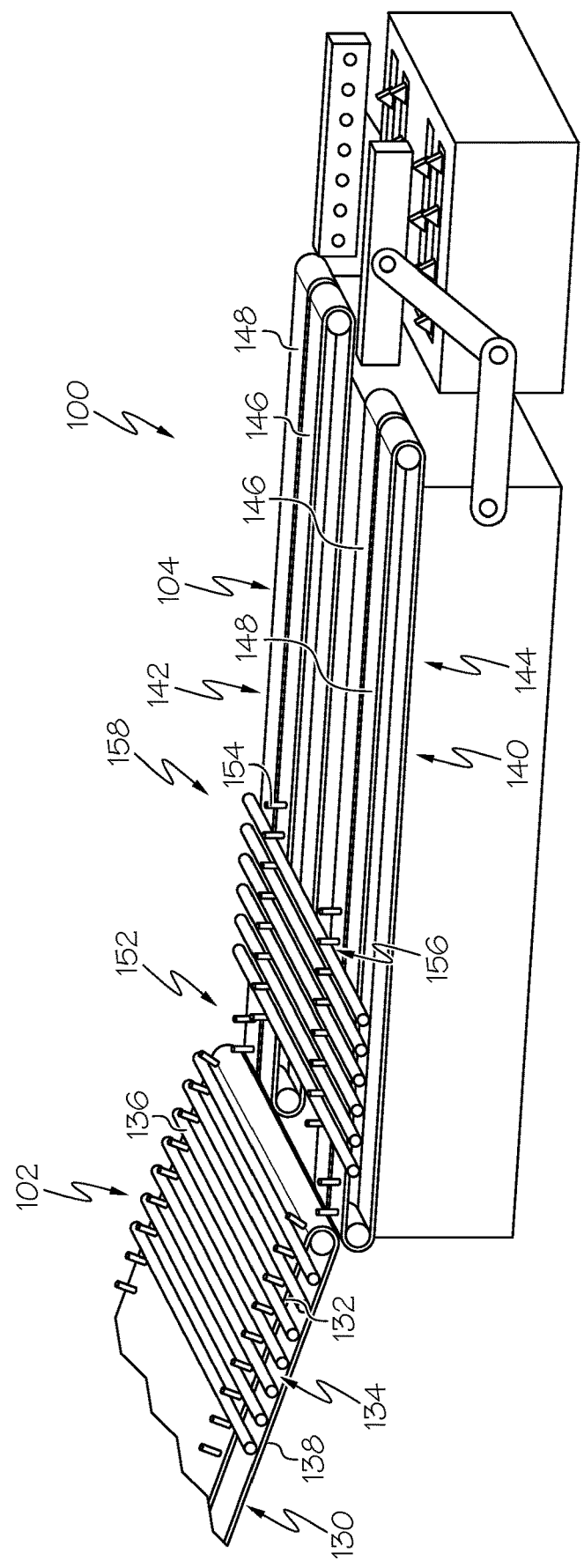
FIG. 6 is a perspective side view of a portion of the automated glass article bundling and palletizing method and apparatus of FIG. 4, according to one or more embodiments shown and described herein.

FIGS. 6-17 diagrammatically illustrate the stations 102, 108, 112, 116 and 123 and robotic lift assemblies 110, 114, 118 and 125 in greater detail and in operation. Referring first to FIG. 6, the bundling and palletizing apparatus 100 includes the infeed station 102 that includes a conveyor 130. The conveyor 130 includes separators 132 in the form of pegs on opposite sides of the conveyor 130 that are spaced-apart from adjacent separators in the conveying direction to provide article retaining regions 134 that each hold a single glass article tube 136. The separators 132 are each mounted to a conveyor belt 138 that moves the separators 132 in the conveying direction and delivers the glass article tubes 136 to the layer separating station 104 in a continuous fashion. As used herein with reference to conveyor motion, "continuous" refers to a smooth conveying motion that does not slow or stop. The term "indexing" refers to slowing or stopping for a relatively short period of time and then moving with precision at a higher speed for another period of time and distance quickly. The term "intermittent" refers to stopping or slowing for a longer period of time, usually so that a process can be performed while slowed or stopped, before moving at a higher speed for another period of time and distance.

Figure 7:
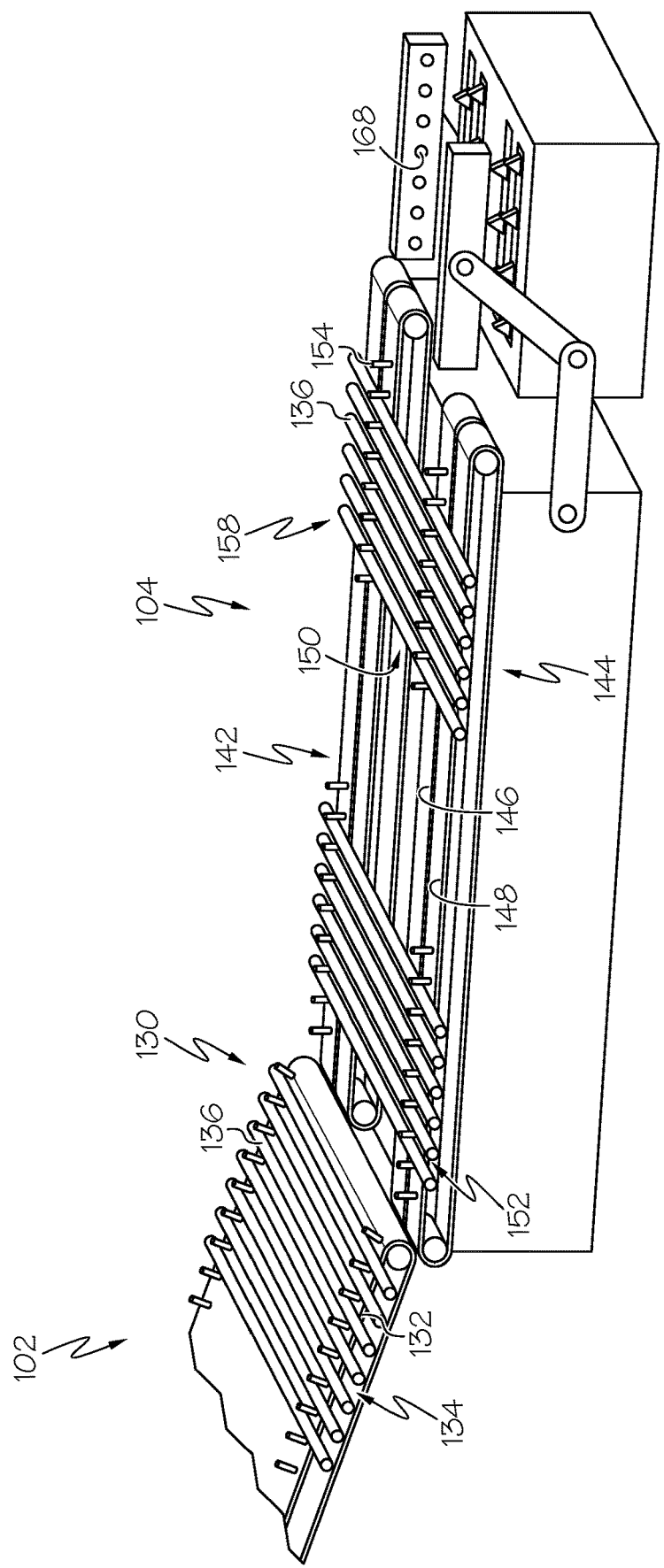
FIG. 7 is a perspective side view of a portion of the automated glass article bundling and palletizing method and apparatus of FIG. 4, according to one or more embodiments shown and described herein.

Referring also to FIG. 7, the conveyor 130 feeds the glass article tubes 136 to the layer separating station 104. The layer separating station 104 includes another conveyor 140 that includes opposite sides 142 and 144, where each side 142, 144 includes conveyor belts 146, 148. In the illustrated example, two conveyor belts 146 and 148 are being used at each side 142 and 144, however, only one or more than two conveyor belts may be used. Using multiple conveyor belts 146 and 148 allows the conveyor 130 to cycle layer separation regions 150 and 152 of separators 154 to the infeed station 102 for receiving glass article tubes 136. In the instance of FIG. 6, for example, the separation region 150 receives a preselected number (e.g., two, three, four, five, six, seven, eight, nine, 10, 15, etc.) of glass article tubes 136, each glass article tube 136 located in its own article retaining region 156. The conveyor belts 146 of the conveyor 140 then move the layer separation region 150 away from the infeed station 102 in the conveying direction at a relatively high rate of speed while the layer separation region 152 is presented to the infeed station 102 and indexed so that each article retaining region 156 receives an individual glass article tube 136. Then, the conveyor belts 146 move the layer separation region 152 away from the infeed station 102 in the conveying direction at a relatively high rate of speed while the layer separation region 150 is presented to the infeed station 102 and indexed so that each retaining region 156 receives and individual glass article tube 136. As can be appreciated, such conveying motion of both indexing and continuous movement of the conveyor belts 146, 148 separates the glass article tubes 136 into glass article layers 158 of side-by-side glass article tubes having a first spaced-apart configuration. The conveying motion can also accommodate for missing glass articles due to being rejected and/or jumping, as discussed above.

Figure 8:
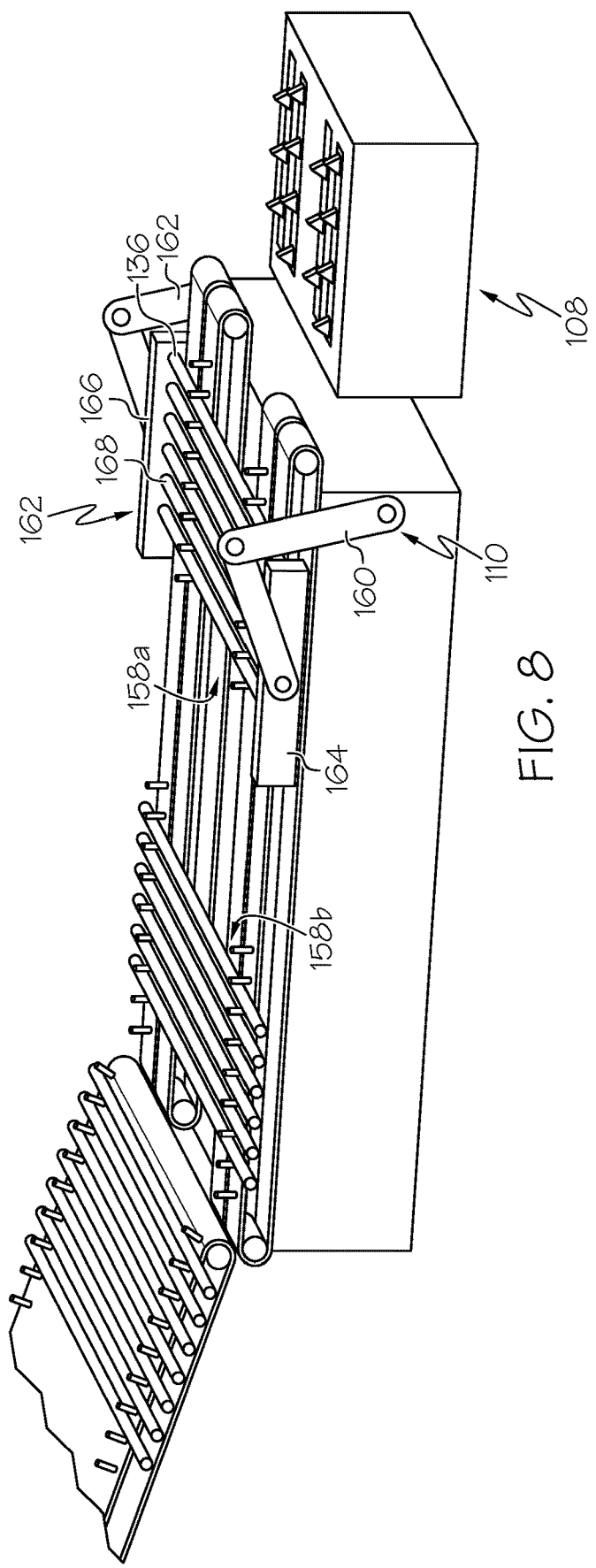
FIG. 8 is a perspective side view of a portion of the automated glass article bundling and palletizing method and apparatus of FIG. 4, according to one or more embodiments shown and described herein.

Referring to FIG. 8, once glass article layer 158a is separated from an upstream glass article layer 158b being formed, the robotic lift assembly 110 engages the glass article tubes 136 and carries the entire glass article layer 158a to the re-pitch station 108. The robotic lift assembly 110 includes robotic arms 160, 162 that include end-effectors 164, 166 that can be used to simultaneously engage each one of the glass article tubes 136 of the glass article layer 158a, maintaining the pitch between the glass article tubes 136. For example, the end-effectors 164, 166 may include a rows of projections 168 (FIG. 7) that can be inserted into the end of the glass article tubes 136 and used to lift and carry the glass article tubes 136 simultaneously. As another example, the end effectors 164, 166 may include a material of increased friction that can be used to engage the ends of the glass article tubes 136. Any suitable method of engaging the glass article tubes 136 of the glass article layer 158a may be utilized with the robotic lift assembly 110. It should be noted that the end effectors 164 and 166 are configured to engage glass article tubes of different diameters (e.g., between 8.5 mm and 30 mm) and carry an entire glass article layer to the re-pitch station 108. The end effectors 164 may be formed of a relatively soft material that does not damage the glass.

Figure 9:
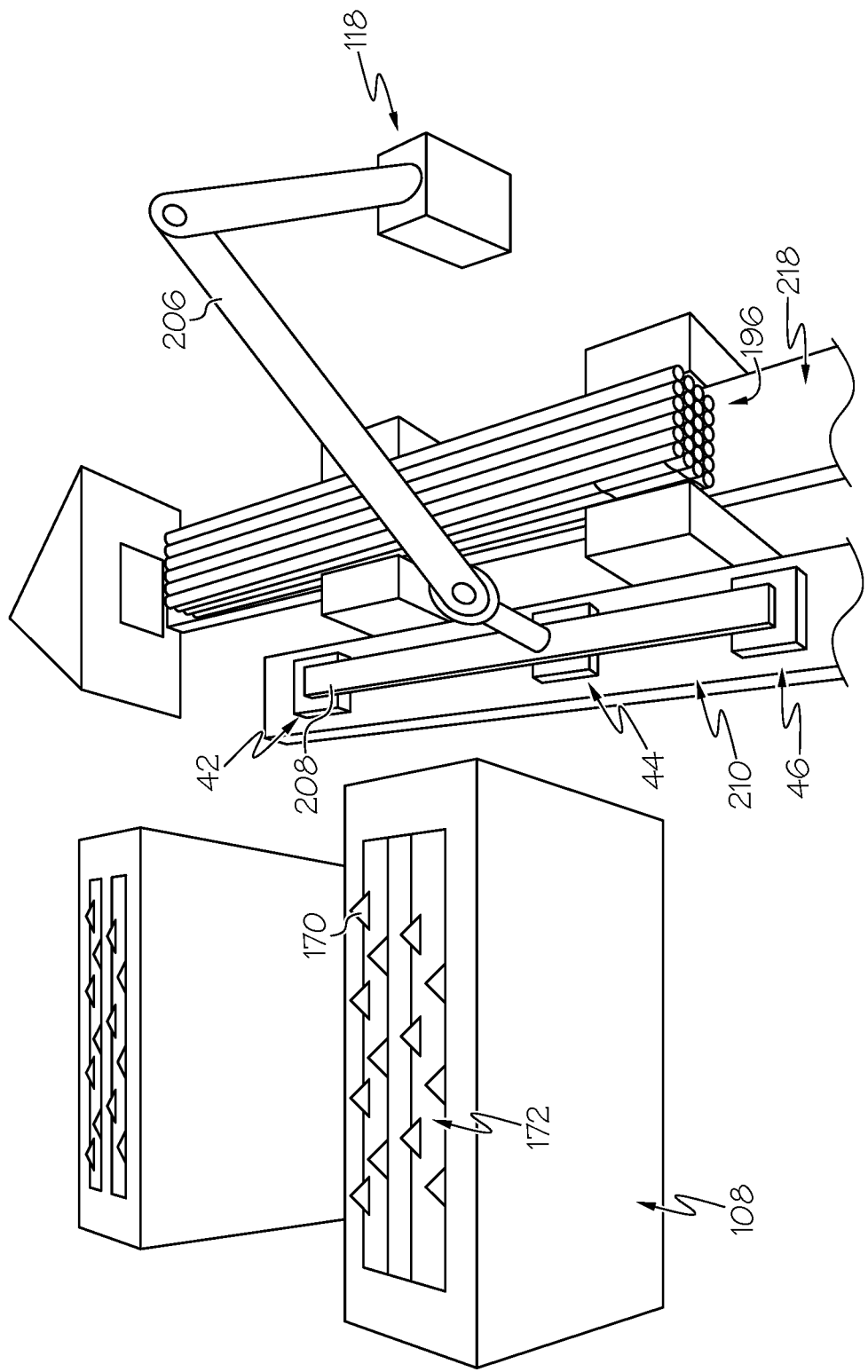
FIG. 9 is a perspective side view of a portion of the automated glass article bundling and palletizing method and apparatus of FIG. 4, according to one or more embodiments shown and described herein.
Figure 10A:
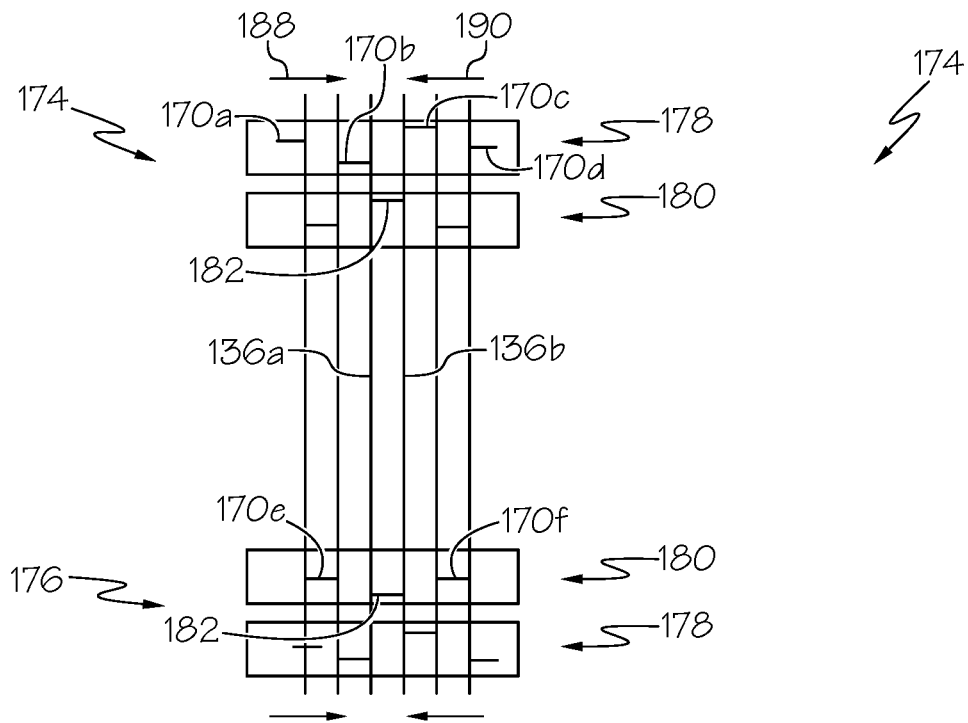
FIG. 10A diagrammatically illustrates a re-pitch operation, according to one or more embodiments shown and described herein FIG. 10B diagrammatically illustrates a re-pitch operation, according to one or more embodiments shown and described herein.
Figure 10B:
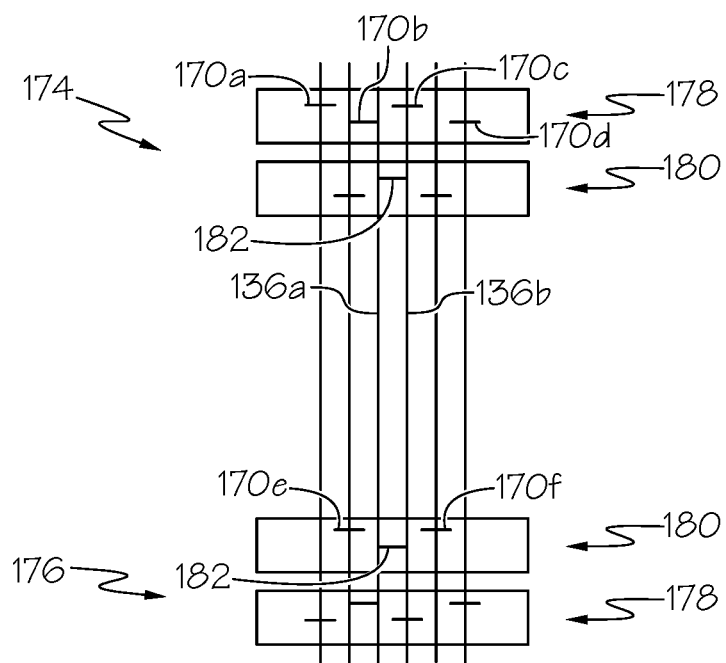
Figure 11A:
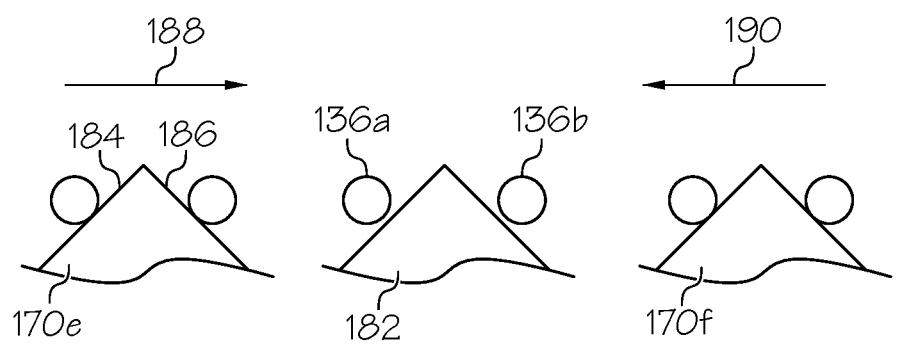
FIG. 11A diagrammatically illustrates a re-pitch operation, according to one or more embodiments shown and described herein.
Figure 11B:
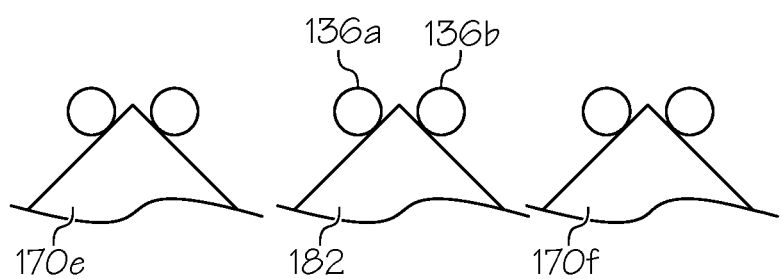
FIG. 11B diagrammatically illustrates a re-pitch operation, according to one or more embodiments shown and described herein.

Referring to FIG. 9, the robotic lift assembly 110 carries the glass article layer 158a in the first spaced-apart configuration to the re-pitch station 108. The re-pitch station 108 includes moveable separators 170 that can be moved to provide adjustable article retaining regions 172. FIGS. 10A, 10B and 11A, 11B diagrammatically illustrate the action of the moveable separators 170. Referring first to FIGS. 10A and 11A, the re-pitch station includes a first re-pitch apparatus 174 and a second re-pitch apparatus 176 spaced-apart from the first re-pitch apparatus 174 in the cross-conveying direction. While two re-pitch apparatuses are shown, there may be one or more than two re-pitch apparatuses. Each re-pitch apparatus includes an outer set 178 of the moveable separators 170 and an inner set 180 of the moveable separators 170. The outer set 178 of moveable separators 170 includes moveable separators 170a, 170b, 170c and 170d and the inner set 180 includes moveable separators 170e and 170f. A stationary separator 182 is provided between center glass article tubes 136a and 136b. Referring particularly to FIG. 11A, the separators 170e, 170f and 182 are ramp-shaped (e.g., triangular) and are sized to allow the glass article tubes 136 to rest on their ramp-shaped side surfaces 184 and 186 in the first spaced-apart configuration. During a re-pitch operation, the moveable separators 170a, 170b and 170e move linearly in the conveying direction toward the stationary separator 182 and the moveable separators 170c. 170d and 170f move linearly in the opposite direction toward the stationary separator 180, as represented by arrows 188 and 190. This movement of the moveable separators 170 toward the stationary separator 182 reduces the pitch of the glass article layer 158a to a second spaced-apart configuration, as shown by FIGS. 10B and 11B. The ramp-shape of the separators 170, 182 allow the glass article tubes 136 to ride up the ramp-shape side surfaces 184 and 186, closer to one another as the moveable separators 170 move toward each other where the glass article tubes 136 can be held in the second spaced-apart configuration using the separators 170a-170d (FIG. 10B).

Figure 12:
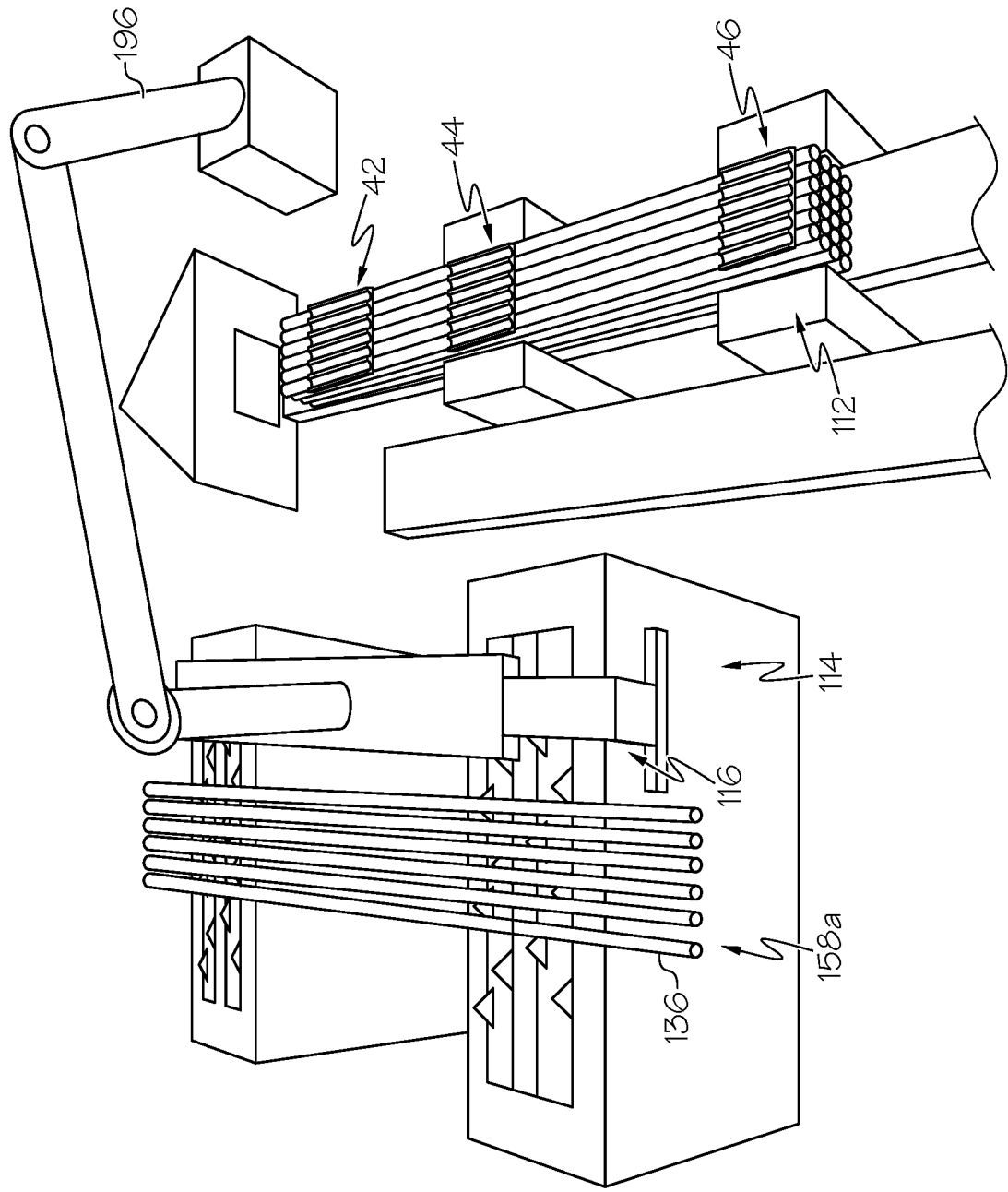
FIG. 12 is a perspective side view of a portion of the automated glass article bundling and palletizing method and apparatus of FIG. 4, according to one or more embodiments shown and described herein.

Referring to FIG. 12, the robotic lift assembly 114 includes an end effector 194 that can be used to engage the entire glass article layer 158a of the glass article tubes 136 in the second spaced-apart configuration and carry the glass article layer 158a to the bundle build station 112. At the bundle build station 112, layer separation inserts 42, 44 and 46 are waiting for the glass article layer 158a. The robotic lift assembly 114 includes a robotic arm 196 that places all glass article tubes 136 of the glass article layer 158a within individual article receiving slots 50 (FIG. 3) using the end effector 194. In the illustrated instance, the layer separation inserts 42, 44 and 46 are placed on a partially built bundle 196.

Figure 13:
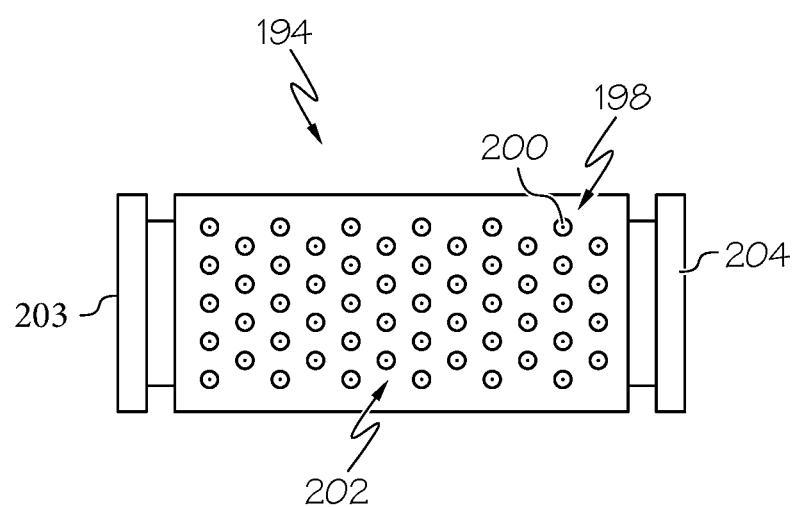
FIG. 13 diagrammatically illustrates an end effector that is configured to lift glass article layers of glass article tubes of different diameters, according to one or more embodiments shown and described herein.

Referring briefly to FIG. 13, the end effector 194 may be configured to engage glass article tubes 136 of different diameters (e.g., between 8.5 mm and 30 mm). As an example, the end effector 194 may include glass pick-up devices 198 that are configured to engage and hold the glass article tubes 136. The glass pick-up devices 198 may include suction nozzles 200 that are arranged along an article engaging side 202 of the end effector 194. The suction nozzles 200 are in communication with a vacuum source to supply a negative pressure through the suction nozzle 200 that is used to engage the glass article tubes 136. The end effector 194 may also include end engagement fingers 203 and 204 that can be used to engage opposite ends of the glass article tubes 136.

Figure 14:
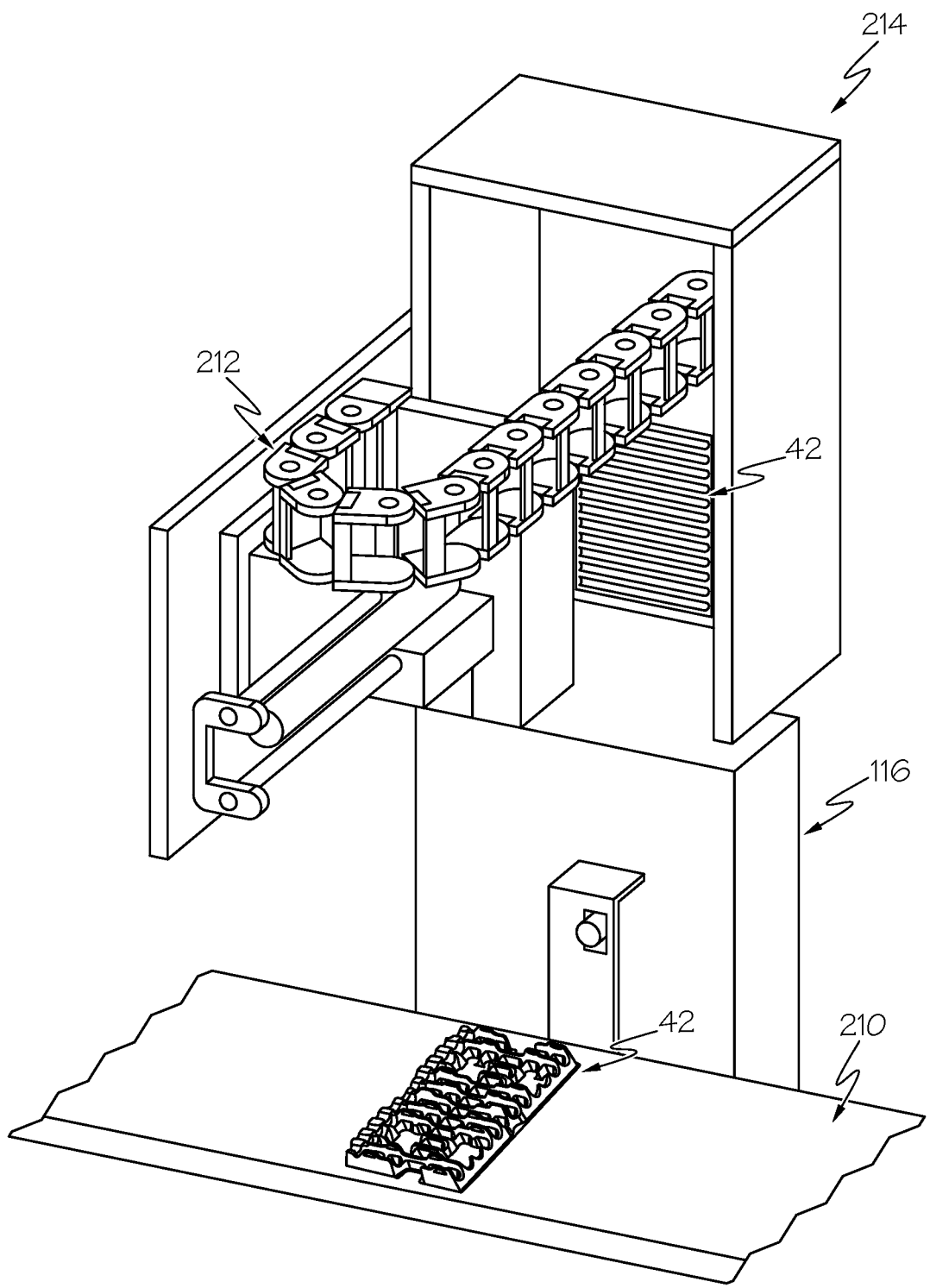
FIG. 14 is a perspective side view of a portion of the automated glass article bundling and palletizing method and apparatus of FIG. 4, according to one or more embodiments shown and described herein.

Referring again to FIG. 9, the robotic lift assembly 118 may be used to pick empty layer separation inserts 42, 44 and 46 and place them atop the partially built bundle 196. The robotic lift assembly 118 includes a robotic arm 206 that includes an end effector 208 that is configured to grasp the layer separation inserts 42, 44 and 46 simultaneously from an insert infeed conveyor 210 and place them simultaneously on the partially built bundle 196. Referring to FIG. 14, the insert feed station 116 includes robotic pick assemblies 212 that are configured to pick the layer separation inserts 42, 44 and 46 from insert feed mechanisms 214. The insert feed mechanisms 214 index the layer separation inserts 42, 44 and 46 to the robotic pick assemblies 212. In some embodiments, there may be three robotic pick assemblies 212 and insert feed mechanisms 214, one for each of the layer separation inserts 42, 44 and 46. The insert infeed conveyor 210 conveys the layer separation inserts 42, 44 and 46 to the bundle build station 112.

Figure 15:
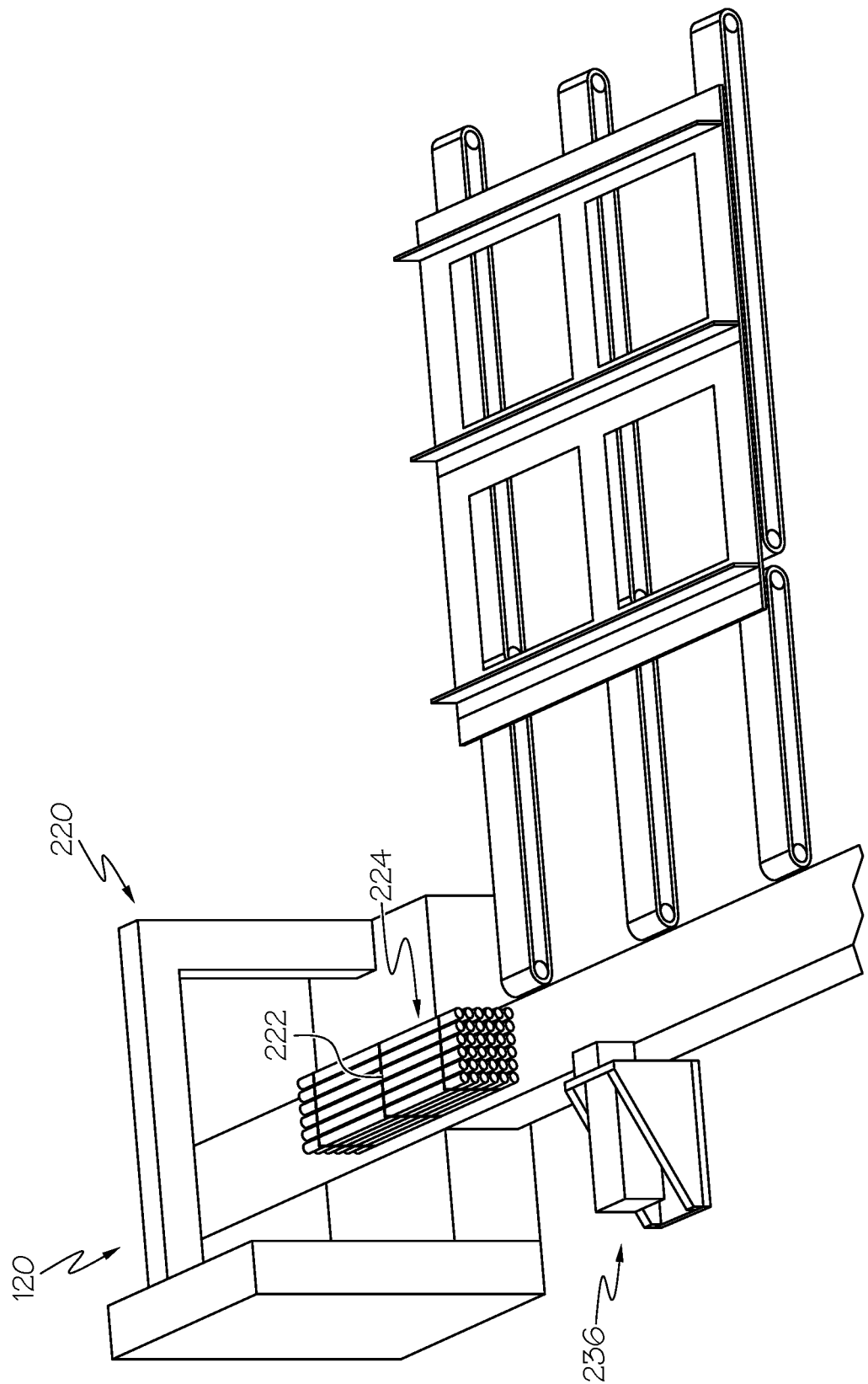
FIG. 15 is a perspective side view of a portion of the automated glass article bundling and palletizing method and apparatus of FIG. 4, according to one or more embodiments shown and described herein.
Figure 16:
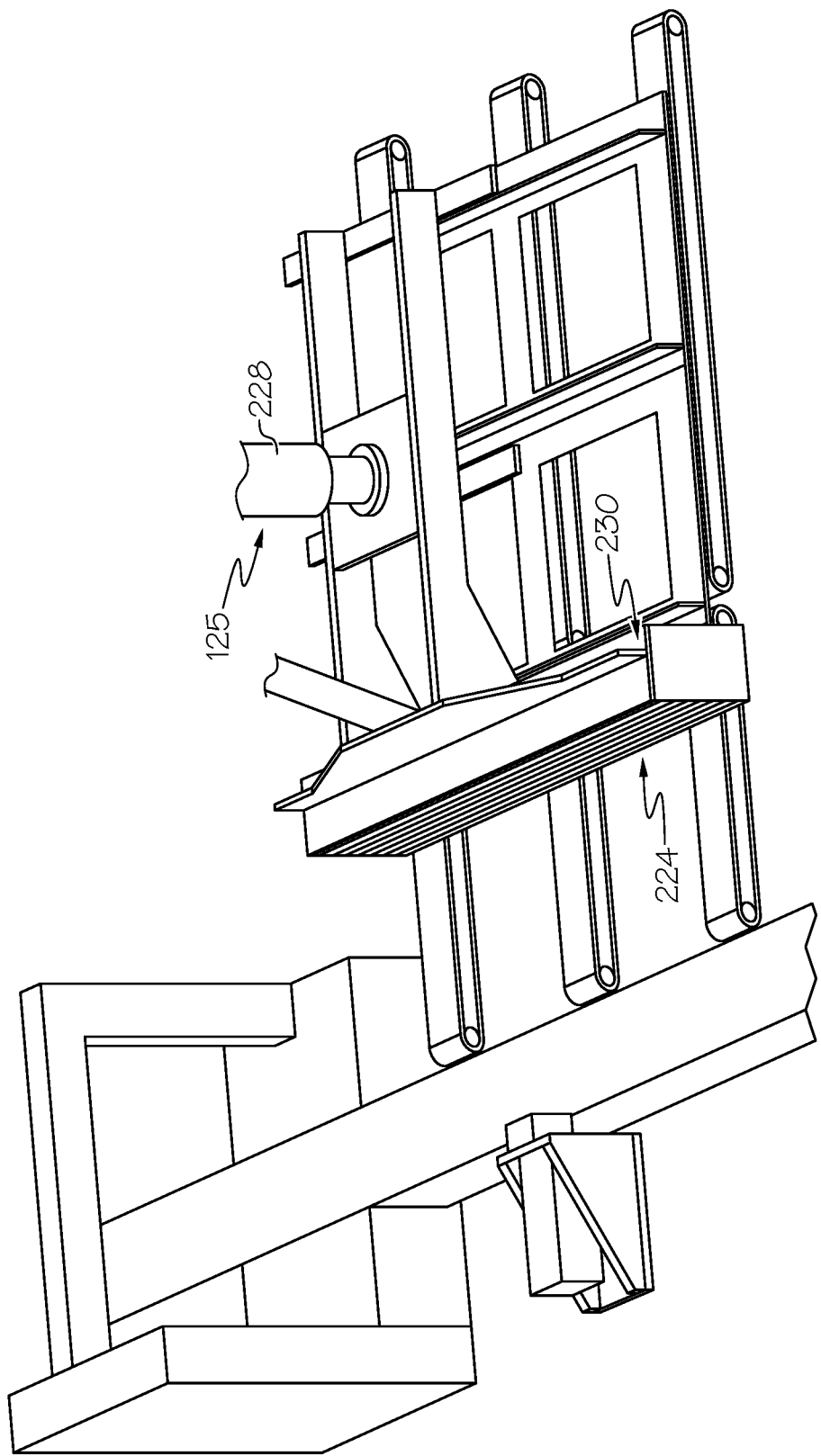
FIG. 16 is a perspective side view of a portion of the automated glass article bundling and palletizing method and apparatus of FIG. 4, according to one or more embodiments shown and described herein.
Figure 17:
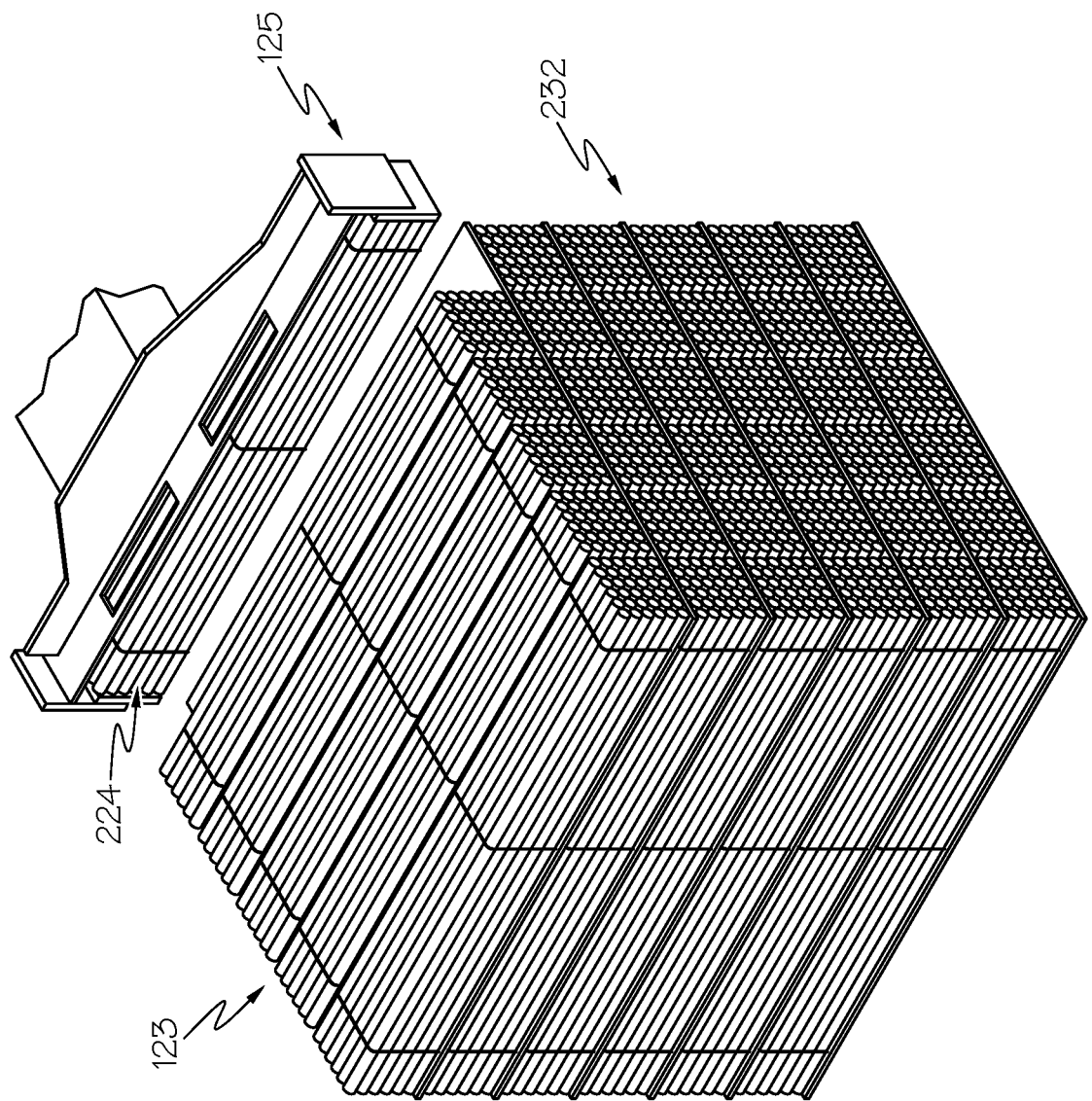
FIG. 17 is a perspective side view of a portion of the automated glass article bundling and palletizing method and apparatus of FIG. 4, according to one or more embodiments shown and described herein.

Referring to FIG. 9, once the bundle is fully built, the bundle is conveyed toward the bundle packaging system 120 using a bundle conveyor 218. Referring now to FIG. 15, the bundle packaging system 120 includes a banding apparatus 220 that is used to place a band 222 around ends of a bundle 224. The bundle 224 is then conveyed to an inspection station 236 where the control system 124 (FIG. 4), inspects the bundle 224 and bundle 224 is either moved to the pallet building station 123 (FIG. 17) or rejected. Referring to FIG. 16, the bundle 224 may be moved by the robotic lifting assembly 125 that includes a robotic arm 228 and an end effector 230 that is configured to engage ends of the bundle 224. The bundle 224 is then moved to a partially built pallet 232 at the pallet building station 123 (FIG. 17).

The above-described apparatuses and methods can be used to handle and package relatively large numbers of glass articles, while minimizing or even eliminating glass-to-glass contact or human contact with the glass articles. Such an arrangement can reduce potential glass article fracture sites (scratches, defects, chips, etc.), which can, in turn, improve strength of the glass articles and improve cleanliness by eliminating human contact. A vision system may be used to track the glass articles determine whether or not the layers, bundles and pallets are being built according to specifications.

Embodiments can be described with reference to the following numbered clauses, with preferred features laid out in the dependent clauses:

Clause 1: An apparatus that forms bundles of glass articles, the apparatus comprising: a glass article infeed station comprising an infeed conveyor that continuously transports individual glass articles to a layer separating conveyor, the layer separating conveyor comprising a conveyor belt that forms a layer of side-by-side glass articles; and a robotic lift assembly configured to place the layer of side-by-side glass articles together on a layer separation insert, the layer separation insert having side-by-side slots that each receive a single glass article of the layer of side-by-side glass articles.

Clause 2: The apparatus of clause 1, wherein the robotic lift assembly comprises an end of arm tool that includes glass pick-up devices that are arranged and configured to engage glass articles having different diameters.

Clause 3: The apparatus of clause 2, wherein the glass pick-up devices comprise suction nozzles.

Clause 4: The apparatus of clause 1 or 2, wherein the layer separating conveyor comprises the conveyor belt configured to intermittently separate layers of side-by-side glass articles from adjacent layers of side-by-side glass articles.

Clause 5: The apparatus of clause 4, wherein the robotic lift assembly is configured to stack the layers of side-by-side glass articles forming part of a bundle.

Clause 6: The apparatus of clause 5 further comprising a controller that uses a sensor to automatically detect an absence of a glass article from the layer of side-by-side glass articles.

Clause 7: The apparatus of any of clauses 1-6, wherein the layer separating conveyor comprises sectioned article retaining regions that are each sized and configured to retain a single glass article spaced from adjacent glass articles.

Clause 8: The apparatus of clause 7 further comprising a controller that uses a sensor to automatically detect multiple glass articles in a single article retaining region.

Clause 9: The apparatus of any of clauses 1-8 further comprising a controller that uses a sensor to automatically identify a preselected number of glass articles in the layer of side-by-side glass articles.

Clause 10: The apparatus of any of clauses 1-9 further comprising a re-pitch station comprising adjustable article retaining regions that adjust position automatically to decrease a distance between adjacent side-by-side glass articles of the layer before the robotic lift assembly places the layer of side-by-side articles together on the layer separation insert.

Clause 11: The apparatus of clause 10, wherein the robotic lift assembly is a first robotic lift assembly, the apparatus comprising a second robotic lift assembly that moves the layer of side-by-side glass articles together from the layer separating conveyor to the re-pitch station.

Clause 12: The apparatus of clause 11 further comprising a third robotic lift assembly that places another layer separation insert on the layer of side-by-side glass articles.

Clause 13: A method of handling glass articles to form bundles of the glass articles, the method comprising: continuously transporting individual glass articles in the form of glass tubes or rods having a first outer diameter to a layer separating conveyor and forming a first layer of side-by-side glass articles on the layer separating conveyor; and using a robotic lift assembly, placing the first layer of side-by-side glass articles together on a layer separation insert, the layer separation insert having side-by-side slots that each receive a single glass article of the first layer of side-by-side glass articles.

Clause 14: The method of clause 13 further comprising: continuously transporting individual glass articles in the form of tubes or rods having a second outer diameter different from the first diameter to the layer separating conveyor and forming a second layer of side-by-side glass articles on the layer separating conveyor; and using the robotic lift assembly, placing the second layer of side-by-side glass articles together on another layer separation insert, the another layer separation insert having side-by-side slots that each receive a single glass article of the second layer of side-by-side glass articles.

Clause 15: The method of clause 14 further comprising: stacking the first layer of side-by-side glass articles having the first outer diameter on another layer of side-by-side glass articles having the first outer diameter and forming a first bundle; and stacking the second layer of side-by-side glass articles having the second outer diameter on another layer of side-by-side glass articles having the second outer diameter forming a second bundle; wherein the first bundle and second bundle have at least one or more of a same width, length and height.

Clause 16: The method of clause 14 or 15, wherein the robotic lift assembly comprises an end of arm tool that includes glass pick-up devices that are arranged and configured to engage the glass articles of the first layer and to move the first layer of side-by-side glass articles when forming a first bundle, the glass pick-up devices arranged and configured to engage glass articles of the second layer and move the second layer of side-by-side articles when forming a second bundle.

Clause 17: The method of clause 16, wherein the glass pick-up devices comprise suction nozzles.

Clause 18: The method of any of clauses 13-17 further comprising the layer separating conveyor separating the first layer of side-by-side glass articles from an adjacent layer of side-by-side glass articles.

Clause 19: The method of clause 18 further comprising the robotic lift assembly stacking the another layer and first layer of side-by-side glass articles and forming part of a bundle.

Clause 20: The method of clause 19 further comprising wrapping a band around the bundle at a bundle wrapping station.

Clause 21: The method of any of clauses 13-20 further comprising using a sensor, a controller automatically detecting an absence of a glass article from the first layer of side-by-side glass articles.

Clause 22: The method of any of clauses 13-21, wherein the layer separating conveyor comprises sectioned article retaining regions that are each sized and configured to retain a single glass article spaced from adjacent glass articles.

Clause 23: The method of clause 22 further comprising, using a sensor, a controller automatically detecting multiple glass articles in a single article retaining region.

Clause 24: The method of clause 23, wherein the layer separating conveyor rejecting the multiple glass articles in the single retaining region.

Clause 25: The method of any of clauses 13-24 further comprising, using a sensor, a controller automatically identifying a preselected number of glass articles in the first layer of side-by-side glass articles.

Clause 26: The method of any of clauses 13-26 further comprising automatically decreasing a distance between adjacent side-by-side glass articles of the first layer at a re-pitch station before the step of placing the first layer of side-by-side articles together on the layer separation insert.

Clause 27: An apparatus that forms bundles of glass articles, the apparatus comprising: a layer separating conveyor comprising a conveyor belt that forms a layer of side-by-side glass articles; and a robotic lift assembly configured to place the layer of side-by-side glass articles in a first spaced-apart configuration together on a re-pitch station that comprises adjustable article retaining regions that adjust position automatically to decrease a distance between adjacent side-by-side glass articles to a second spaced-apart configuration.

Clause 28: The apparatus of clause 27, wherein the robotic lift assembly is a first robotic lift assembly, the apparatus further comprising a second robotic lift assembly configured to place the layer of side-by-side glass articles in the second spaced-apart configuration on a layer separation insert, the layer separation insert having side-by-side slots that each receive a single glass article of the layer of side-by-side glass articles.

Clause 29: The apparatus of clause 28, wherein the second robotic lift assembly comprises an end of arm tool that includes glass pick-up devices that are arranged and configured to engage glass articles having different diameters.

Clause 30: The apparatus of clause 29, wherein the glass pick-up devices comprise suction nozzles.

Clause 31: The apparatus of any of clauses 27-30, wherein the layer separating conveyor comprises a conveyor belt configured to separate the layer of side-by-side glass articles from an adjacent layer of side-by-side glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An apparatus that forms bundles of glass articles, the apparatus comprising:
   a glass article infeed station comprising an infeed conveyor that continuously transports individual glass articles to a layer separating conveyor, the layer separating conveyor comprising a conveyor belt that forms a layer of side-by-side glass articles;
   a robotic lift assembly configured to place the layer of side-by-side glass articles together on a layer separation insert, the layer separation insert having side-by-side slots that each receive a single glass article of the layer of side-by-side glass articles; and
   a re-pitch station comprising adjustable article retaining regions that adjust position automatically to decrease a distance between adjacent side-by-side glass articles of the layer before the robotic lift assembly places the layer of side-by-side articles together on the layer separation insert.

2. The apparatus of claim 1, wherein the robotic lift assembly comprises an end of arm tool that includes glass pick-up devices that are arranged and configured to engage glass articles having different diameters.

3. The apparatus of claim 1, wherein the layer separating conveyor comprises the conveyor belt configured to intermittently separate layers of side-by-side glass articles from adjacent layers of side-by-side glass articles.

4. The apparatus of claim 3, wherein the robotic lift assembly is configured to stack the layers of side-by-side glass articles forming part of a bundle.

5. The apparatus of claim 4 further comprising a controller that uses a sensor to automatically detect an absence of a glass article from the layer of side-by-side glass articles.

6. The apparatus of claim 1, wherein the layer separating conveyor comprises sectioned article retaining regions that are each sized and configured to retain a single glass article spaced from adjacent glass articles.

7. The apparatus of claim 6 further comprising a controller that uses a sensor to automatically detect multiple glass articles in a single article retaining region.

8. The apparatus of claim 1 further comprising a controller that uses a sensor to automatically identify a preselected number of glass articles in the layer of side-by-side glass articles.

9. The apparatus of claim 1, wherein the robotic lift assembly is a first robotic lift assembly, the apparatus comprising a second robotic lift assembly that moves the layer of side-by-side glass articles together from the layer separating conveyor to the re-pitch station.

10. A method of handling glass articles to form bundles of the glass articles, the method comprising:
   continuously transporting individual glass articles in the form of glass tubes or rods having a first outer diameter to a layer separating conveyor and forming a first layer of side-by-side glass articles on the layer separating conveyor; and
   using a robotic lift assembly, placing the first layer of side-by-side glass articles together on a layer separation insert, the layer separation insert having side-by-side slots that each receive a single glass article of the first layer of side-by-side glass articles; and
   automatically decreasing a distance between adjacent side-by-side glass articles of the first layer at a re-pitch station before the step of placing the first layer of side-by-side articles together on the layer separation insert.

11. The method of claim 10 further comprising:
   continuously transporting individual glass articles in the form of tubes or rods having a second outer diameter different from the first diameter to the layer separating conveyor and forming a second layer of side-by-side glass articles on the layer separating conveyor; and
   using the robotic lift assembly, placing the second layer of side-by-side glass articles together on another layer separation insert, the another layer separation insert having side-by-side slots that each receive a single glass article of the second layer of side-by-side glass articles.

12. The method of claim 11 further comprising:
   stacking the first layer of side-by-side glass articles having the first outer diameter on another layer of side-by-side glass articles having the first outer diameter and forming a first bundle; and
   stacking the second layer of side-by-side glass articles having the second outer diameter on another layer of side-by-side glass articles having the second outer diameter forming a second bundle;
   wherein the first bundle and second bundle have at least one or more of a same width, length and height.

13. The method of claim 11, wherein the robotic lift assembly comprises an end of arm tool that includes glass pick-up devices that are arranged and configured to engage the glass articles of the first layer and to move the first layer of side-by-side glass articles when forming a first bundle, the glass pick-up devices arranged and configured to engage glass articles of the second layer and move the second layer of side-by-side articles when forming a second bundle.

14. The method of claim 10 further comprising the layer separating conveyor separating the first layer of side-by-side glass articles from an adjacent layer of side-by-side glass articles.

15. The method of claim 14 further comprising the robotic lift assembly stacking the another layer and first layer of side-by-side glass articles and forming part of a bundle.

16. The method of claim 15 further comprising wrapping a band around the bundle at a bundle wrapping station.

17. The method of claim 10 further comprising using a sensor, a controller automatically detecting an absence of a glass article from the first layer of side-by-side glass articles.

18. The method of claim 10, wherein the layer separating conveyor comprises sectioned article retaining regions that are each sized and configured to retain a single glass article spaced from adjacent glass articles.

19. The method of claim 18 further comprising, using a sensor, a controller automatically detecting multiple glass articles in a single article retaining region.

20. The method of claim 10 further comprising, using a sensor, a controller automatically identifying a preselected number of glass articles in the first layer of side-by-side glass articles.

* * * * *